(12) United States Patent
Goodman

(10) Patent No.: US 7,275,131 B2
(45) Date of Patent: Sep. 25, 2007

(54) CACHE REFRESH ALGORITHM AND METHOD

(75) Inventor: Brian D. Goodman, New York, NY (US)

(73) Assignee: International Business Machines Corporation, Armonk, NY (US)

(*) Notice: Subject to any disclaimer, the term of this patent is extended or adjusted under 35 U.S.C. 154(b) by 201 days.

(21) Appl. No.: 11/019,874

(22) Filed: Dec. 22, 2004

(65) Prior Publication Data
US 2006/0136669 A1 Jun. 22, 2006

(51) Int. Cl.
G06F 12/16 (2006.01)
(52) U.S. Cl. ............................ 711/106; 711/118
(58) Field of Classification Search ............ 711/106
See application file for complete search history.

(56) References Cited

U.S. PATENT DOCUMENTS

| | | | | |
|---|---|---|---|---|
| 5,761,703 A | * | 6/1998 | Bolyn | 711/106 |
| 5,901,100 A | * | 5/1999 | Taylor | |
| 6,128,701 A | * | 10/2000 | Malcolm et al. | 711/133 |
| 6,570,803 B2 | * | 5/2003 | Kyung | 365/222 |
| 6,717,863 B2 | * | 4/2004 | Afghahi et al. | |
| 6,760,813 B1 | * | 7/2004 | Wu | |
| 2004/0111413 A1 | * | 6/2004 | Birbo et al. | |

FOREIGN PATENT DOCUMENTS

JP  200011687  * 1/2000

OTHER PUBLICATIONS

English Abstract.*
Chris Olston, et al., Adapative Precision Setting for Cached Approximate Values, ACM Sigmod 2 Santa Barbara, California, USA, pp. 355-366; May 2001.*
Joe Chun-Hung Yuen, et al., Cache Invalidation Scheme for Mobile Computing Systems With Real-Record, vol. 29, No. 4, Dec. 2000, pp. 34-39.*

* cited by examiner

*Primary Examiner*—Reginald Bragdon
*Assistant Examiner*—Tyler Willhite
(74) *Attorney, Agent, or Firm*—F. Chau & Associates, LLC

(57) ABSTRACT

We present, in an exemplary embodiment of the present invention, a novel method for providing cache refresh within a finite time window (i.e., a time-box) with predictable accuracy and given constrained resources. Instead of refreshing the entire cache in a specified time window, we introduce an error. As used herein, the term "error" refers to a period of time. By introducing error, we effectively and dynamically widen the time-box to distribute the refresh activity.

20 Claims, 3 Drawing Sheets

| Formula | Abbreviation | Definition |
|---|---|---|
| | cs | Cache size |
| | tbr | Time between refresh |
| | rt | Refresh time |
| | ps | Pool size |
| $\left(\dfrac{cs}{\left(\dfrac{tbr}{rt}\right) \times ps}\bigg/2\right) \times tbr = et$ | et | Error time |

FIG. 1

| Example | Abbreviation | Definition |
|---|---|---|
| $cs = 1{,}000{,}000$ | cs | Cache size |
| $tbr = 60{,}000\ ms$ | tbr | Time between refresh |
| $rt = 100\ ms$ | rt | Refresh time |
| $ps = 50$ | ps | Pool size |
| $et \cong 1{,}000{,}000\ ms$ | et | Error time |
| $et \cong 1000\ sec$ | | |
| $et \cong 17\ min$ | | |

FIG. 2

CACHE REFRESH ALGORITHM AND METHOD

BACKGROUND OF THE INVENTION

1. Field of the Invention

The present invention relates to a computer-based memory system, and, more particularly, to methods for providing cache refresh within a finite time window with predictable accuracy and constrained resources.

2. Description of the Related Art

Performance-oriented and disconnected applications are typically executed on caching-based computer systems. Caching occurs any time content or resources are retrieved, assembled or created, and then stored for later use. Caching often delivers increases in overall performance. Furthermore, it reduces the dependency on resource availability (e.g., the network, the cached resource).

An issue computer architects and developers struggle with is maintaining data freshness. The data being cached generally has a limited, useful life span. That is, at some point, the data in the cache may no longer accurately reflect the data at the source. At this point, the invalid data (i.e., the data in the cache) can either be purged, or it can be refreshed.

There are a number of known approaches to purging or refreshing the invalid data. First, an application may systematically refresh the invalid data given a satisfied condition (e.g., time, access). Second, a more advanced solution may provide a messaging-based solution where caches listen and post changes to a common message bus. A source may submit data changes to the message bus, or the caches can potentially provide refresh and publish functionality. Third, databases may have a timestamp field to enable querying of recently changed objects. This type of query often helps with synchronization, and is often referred to as polling. With polling, the source data is checked periodically to see if it has changed, and the source data is pulled only if it has changed. Fourth, the Hypertext Transfer Protocol ("HTTP") specification may attempt to address the issue of purging or refreshing the invalid data using special meta tags called cache control headers, as specified by the HTTP protocol specification. The cache control headers are directed to browsers and proxy servers to specify how long to cache the resource and when to check for a new resource.

Each of the above approaches share the same problem—there may be more cache items to refresh than there are resources (e.g., CPU, memory, network bandwidth) or time to actually refresh the cache item. Specific challenges arise when dealing with large caches employing a time-based refresh strategy. In a time-based refresh strategy, the items in a cache are refreshed after a specific period of time. This time period is often referred to as the "time of usefulness" of the data. A problem occurs when the cache contains more items than are possible to refresh within a specified time window. Once the cache refresh misses a targeted window, the accuracy of the data becomes exponentially out-of-date because the data expires faster than the rate of refresh.

SUMMARY OF THE INVENTION

In one aspect of the present invention, a method for determining an error time is provided. The method includes identifying a cache size of a cache; determining a time-between-refresh; determining a size of a pool, wherein the pool comprises at least one process for refreshing at least one item; determining a refresh time based on the time to refresh one of the at least one item in the cache using one of the at least one process; and determining the error time based on the cache size, the time-between-refresh, the refresh time and the size of the pool.

In a second aspect of the present invention, a method for refreshing a cache is provided. The method includes receiving a cache size, a time-between-refresh, and a pool size; refreshing a cache item in the cache; updating a refresh time to reflect the time taken to complete the step of refreshing; determining an error time based on the cache size, the time-between-refresh, the refresh time, and the pool size; and determining a next-refresh-time based on the error time.

In a third aspect of the present invention, a program storage device readable by machine, tangibly embodying a program of instructions executable by the machine to perform a method for determining an error time is provided. The method includes identifying a cache size of a cache; determining a time-between-refresh; determining a size of a pool, wherein the pool comprises at least one process for refreshing at least one item; determining a refresh time based on the time to refresh one of the at least one item in the cache using one of the at least one process; and determining the error time based on the cache size, the time-between-refresh, the refresh time and the size of the pool.

In a fourth aspect of the present invention, a program storage device readable by machine, tangibly embodying a program of instructions executable by the machine to perform a method for refreshing a cache is provided. The method includes receiving a cache size, a time-between-refresh, and a pool size; refreshing a cache item in the cache; updating a refresh time to reflect the time taken to complete the step of refreshing; determining an error time based on the cache size, the time-between-refresh, the refresh time, and the pool size; and determining a next-refresh-time based on the error time.

BRIEF DESCRIPTION OF THE DRAWINGS

The invention may be understood by reference to the following description taken in conjunction with the accompanying drawings, in which like reference numerals identify like elements, and in which:

FIG. 1 depicts a table illustrating a cache refresh formula for determining a time window that allows each item in the cache to be refreshed within the limitation of pool size, in accordance with one exemplary embodiment of the present invention;

FIG. 2 depicts a table illustrating an execution of the formula of FIG. 1 given exemplary input, in accordance with one exemplary embodiment of the present invention.

DETAILED DESCRIPTION OF PREFERRED EMBODIMENTS

Figure 3:
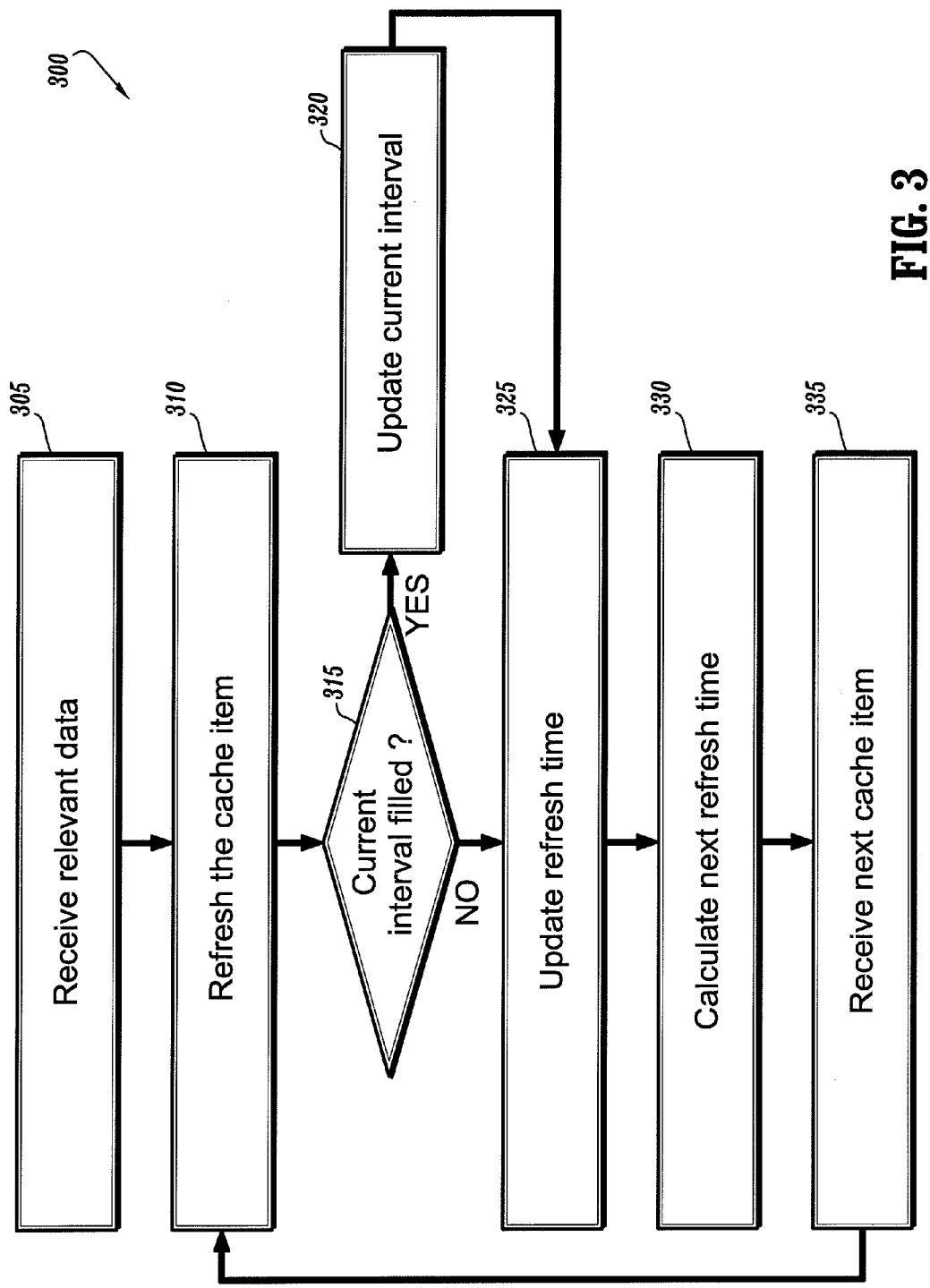
FIG. 3 depicts a flow diagram of a cache refresh method including the formula in FIG. 1, in accordance with one exemplary embodiment of the present invention.

Illustrative embodiments of the invention are described below. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It should be understood that the systems and methods described herein may be implemented in various forms of hardware, software, firmware, or a combination thereof.

We present, in an exemplary embodiment of the present invention, a novel method for providing cache refresh within a finite time window (i.e., a time-box) with predictable accuracy and given constrained resources.

As the size of persistent caches using a time-based refresh grow, the ability of the persistent caches to keep their data current is gravely challenged. This relates to the idea of a concurrency factor, which refers to the number of items in the cache that can be refreshed at any one time. If this number is too low or the refresh time is too large, the cache may struggle to sufficiently refresh the data. If a concurrency factor is increased such that more items can be processed at one time, then available resources may become limited.

Changing the concurrency factor may be compared to increasing the number of objects in a pool. For example, when working with database-driven, web applications, a finite number of database connections are available to the web application. The web application environment often provides a connection pool manager. A connection pool manager provides a maintenance and management layer around a reusable resource (e.g., database connections, ldap connections, objects). The connection pool manager ensures the resource is used within the limitations of the environment. Tuning the pool is a common step in addressing application performance. However, increasing the concurrency factor is not always an option because, for example, as the demand for refresh concurrency grows, the resources needed to satisfy this growth either consume needed system resources (e.g., CPU, RAM, network connections, bandwidth) or add additional overhead limiting overall system effectiveness.

An example of the concurrency problem described above is now provided. Assume we have a cache that contains 1,000,000 items. Further assume that each item takes 100 ms to refresh by calling a predetermined database query, and each item is set to refresh every minute, which equals 60,000 ms. We can begin estimating by taking the time between refreshes (60,000 ms) and dividing the time it takes to refresh (100 ms), which yields 600 intervals in which to refresh the data. Dividing the cache size (1,000,000) by 600 yields 1666.667. This means that to support a cache refresh of 1,000,000 items taking 100 ms to refresh requires approximately 1,667 database connections in the pool. While it may be possible, supporting this many connections is often not desired. Because the pool size or the concurrency factor is often regulated to less than 100, sufficient resources to refresh large or slow caches may not be available within a useful time window with any predictability with regard to freshness.

"Time boxing" is often used as an iterative software development strategy. In time boxing, an end date is selected and the scope of a deliverable is adjusted to fit that date. Time boxing forces a deliverable of known size and scope. For example, a project manager might ask a development team to take no more than three days to prototype a solution. This produces a development activity to get executed within a specific start and end date resulting in a deliverable of hopefully corresponding quality. In the case of caching, a "deliverable" refers to a desired behavior from the caching system (i.e., refresh these ten items every hour). The time frame of an hour is referred to as a "time-box."

Instead of refreshing the entire cache in a specified time window, we introduce an error. As used herein, the term "error" refers to a period of time. By introducing error, we effectively and dynamically widen the time-box to distribute the refresh activity.

Referring now to FIG. 1, an exemplary table 100 illustrates a cache refresh formula for determining a time-box that allows each item in the cache to be refreshed within the limitation of pool size. Error time ("et") refers to a time period from the desired origin (e.g., start on Saturday, Feb. 3, 2004 at 4:00:00 PM.). Error time is determined by a number of variables, including cache size, time between refresh, refresh time, and pool size. Cache size ("cs") refers to the number of items needed to be refreshed. Time between refresh ("tbr") refers to the rate at which each refresh is desired. Refresh time ("rt") refresh to the time required to actually refresh each item given one process. Pool size ("ps") refers to the total number of processes available to perform the refresh.

Referring now to FIG. 2, an exemplary table 200 illustrates an exemplary execution of the cache refresh formula in FIG. 1 given some exemplary input. Given a cache size of 1,000,000 items, a time between refresh of 60,000 milliseconds, a refresh time of 100 milliseconds, and a pool size of 50 processes, the error time is determined to be approximately 17 minutes (after converting from milliseconds).

It should be noted that the error time of 17 minutes refers to +/−17 minutes. Thus, an update sequence completes in 34 minutes, and the time-box is 34 minutes. The update sequence refers to all the events needed to update the items in the cache.

In a first execution of the cache refresh formula shown in FIG. 2, it is likely that the first half needs to be skipped until the update sequence has executed. It is important to note that the time box is not set until a full update sequence is complete.

A number of intervals may be determined. An interval refers to the maximum number of items that can be refreshed given a particular time between refresh, a particular pool size, and a refresh time. Using the example provided in FIG. 2, each refresh of an item requires 100 ms given one process. Thus, given a time between refresh of 60,000 ms, 600 (i.e., 60,000/100) items can be refreshed in one given time to refresh given one process. It can then be determined that a maximum of 30,000 (i.e., 600*50) items can be refreshed given a time between refresh of 60,000 ms and a pool size of 50. The number of items (30,000) that can be updated within one time between refresh may be divided into the total number of items (1,000,000) in the cache to determine the number of intervals, 34 (i.e., 1,000,000/30,000≅34), needed to update all of the items in the cache.

Referring now to FIG. 3, an exemplary flow diagram 300 of a cache refresh method including the formula in FIG. 1 is shown. It is important to note that the method is not intended to follow application design. Specifically, the method is described in a serial fashion; however, the formula in FIG. 1 describes the application in terms of concurrency.

Relevant data is received (at 305). The relevant data includes the plurality of variables as described in greater detail above, including cache size, time between refresh, refresh time, and pool size. The relevant data may further include a cache item, which refers to the current item in the cache being refreshed. The cache item is refreshed (at 310). Refreshing a cached item usually involves reading values from the source, master or data owner and updating the values as necessary to reflect an exact copy of the source, master or data owner. The time needed to complete the refresh at step 310 may be noted.

It is then determined whether a current interval is filled (at 315). As described in greater detail above, an interval refers to the maximum number of items that can be refreshed given a particular time between refresh, a particular pool size, and a refresh time. Using the example of FIG. 2, each interval refreshes 30,000 items, and a current interval would fill after 30,000 items have been refreshed. If the current interval is filled, then the current interval is updated (at 320) to a next interval.

After the current interval is updated (at 320) or if the current interval has not been filled, the refresh time is updated (at 325) to reflect the time taken to complete the refresh at step 310. In one exemplary embodiment, the updated refresh time may be determined by cumulatively adding the refresh time for each refresh at step 310 and dividing by the number of refreshes completed at the time.

A next refresh time is calculated (at 330) for the cache item. The next refresh time is determined based on the error time calculated by the formula in FIG. 1 using the updated refresh time determined at step 325.

A next cache item is received (at 335) and the loop restarts at step 310. In one embodiment, the next cache item is received at the request of the next cache item. In an alternate embodiment, an application program may determine which item in the cache will be the next cache item. It should be appreciated that a cache manager may be used to keep track of which items have been received and refreshed by the method 300, as contemplated by those skilled in the art. It should further be appreciated that the loop does not end because the all the items in the cache are continuously updated. That is, when the last item in the cache is updated (at 310), the method 300 receives (at 335) the first item of the cache again.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for determining an error time, comprising:
   identifying a cache size of a cache;
   determining a time-between-refresh;
   determining a size of a pool, wherein the pool comprises at least one process for refreshing at least one item;
   determining a refresh time based on the time to refresh one of the at least one item in the cache using one of the at least one process;
   determining the error time based on the cache size, the refresh time and the size of the pool; and storing error time.

2. The method of claim 1, wherein determining the error time based on the cache size, the refresh time, and the size of the pool is performed by the steps comprising:
   determining a value by multiplying the cache size by the refresh time; and
   determining the error time by dividing the value by the size of the pool.

3. The method of claim 1, further comprising determining intervals of the cache size, wherein each of the intervals comprises a maximum number of the at least one item that can be refreshed based on a time-between-refresh, the refresh time, the cache size, and the size of the pool, and storing the intervals.

4. The method of claim 3, wherein determining intervals of the cache size comprises:

$$\frac{cs}{\frac{tbr}{rt} \times ps} = noi$$

wherein "cs" represents the cache size, "tbr" represents the time-between-refresh, "ps" represents the size of the pool, "rt" represents the refresh time, and "noi" represents the number of intervals.

5. A method for refreshing a cache, comprising:
   receiving a cache size, a time-between-refresh, and a pool size;
   refreshing a cache item in the cache;
   updating a refresh time to reflect the time taken to complete the step of refreshing;
   determining an error time based on the cache size, the refresh time, and the pool size; and
   determining a next-refresh-time based on the error time.

6. The method of claim 5, wherein refreshing the cache item in the cache comprises:
   receiving a value from one of a source, master, and data owner; and
   updating the cache item based on the value to reflect an exact copy of the one of the source, master, and data owner.

7. The method of claim 5, further comprising:
   receiving an old-refresh-time;
   wherein updating a refresh time to reflect the time taken to complete the step of refreshing comprises averaging the result of adding the old-refresh-time to the refresh time.

8. The method of claim 5, wherein determining a next-refresh-time based on the error time comprises doubling the error time.

9. The method of claim 5, further comprising:
   determining whether a current interval is filled; and
   updating the current interval if the current interval is filled.

10. The method of claim 5, wherein refreshing a cache item in the cache comprises receiving the cache item in the cache to be refreshed.

11. The method of claim 10, wherein receiving the cache item in the cache to be refreshed comprises receiving the cache item at the request of the cache item.

12. The method of claim 10, wherein receiving the cache item in the cache to be refreshed comprises receiving the cache item when an application identifies the cache item.

13. The method of claim 5, wherein determining an error time based on the cache size, the refresh time, and the pool size is performed by the steps, comprising:

determining a value by multiplying the cache size by the refresh time; and determining the error time by dividing the value by the size of the pool.

14. The method of claim 5, further comprising determining intervals of the cache size, wherein each of the intervals comprises a maximum number of the cache item that can be refreshed based on the time-between-refresh, the refresh time, the cache size, and the pool size.

15. The method of claim 14, wherein determining intervals of the cache size comprises:

$$\frac{cs}{\frac{tbr}{rt} \times ps} = noi$$

wherein "cs" represents the cache size, "tbr" represents the time-between-refresh, "ps" represents the size of the pool, "rt" represents the refresh time, and "noi" represents the number of intervals.

16. A program storage device readable by machine, tangibly embodying a program of instructions executable by the machine to perform a method for determining an error time, the method comprising:

identifying a cache size of a cache;

determining a time-between-refresh;

determining a size of a pool, wherein the pool comprises at least one process for refreshing at least one item;

determining a refresh time based on the time to refresh one of the at least one item in the cache using one of the at least one process;

determining an error time based on the cache size; the refresh time and the size of the pool; and storing the error time.

17. A program storage device readable by machine, tangibly embodying a program of instructions executable by the machine to perform a method for refreshing a cache, the method comprising:

receiving a cache size, a time-between-refresh, and a pool size;

refreshing a cache item in the cache;

updating a refresh time to reflect the time taken to complete the step of refreshing;

determining an error time based on the cache size, the refresh time, and the pool size; and determining a next-refresh-time based on the error time.

18. A method of refreshing a cache, comprising:

determining a total number of items in a cache to be refreshed;

determining a total number of processes that perform refreshing of the caches;

determining a refresh time based on a time to refresh one of the number of items using one of the processes;

determining an update time from the number of items, the refresh time, and the number of processes; and refreshing the total number of items in the cache during the update time using the total number of processes.

19. The method of claim 18, wherein refreshing the total number of items in the cache during the update time using the total of processes comprises:

determining a count of items from a time between refresh of the total number of items in the cache, the refresh time, and the total number of processes;

determining a total number of intervals by dividing the total number of items in the during each of the number of intervals, refreshing a unique set of the items in the cache, wherein a count of the set equals the count of items.

20. The method of claim 19, wherein determining the count of items comprises:

determining a value by dividing the time between refresh time; and multiplying the value by the total number of processes to generate the count of items.

* * * * *